US012668044B2

(12) United States Patent
Elias et al.

(10) Patent No.: US 12,668,044 B2
(45) Date of Patent: Jun. 30, 2026

(54) RECYCLABLE PACKAGING FILM WITH DIMENSIONAL STABILITY

(71) Applicant: AMCOR FLEXIBLES NORTH AMERICA, INC., Neenah, WI (US)

(72) Inventors: Marcelo B. Elias, Appleton, WI (US); Ross K. Gruetzmacher, Neenah, WI (US); Kevin J. Curie, Appleton, WI (US); Otacilio T. Berbert, Oshkosh, WI (US)

(73) Assignee: AMCOR FLEXIBLES NORTH AMERICA, INC., Neenah, WI (US)

( * ) Notice: Subject to any disclaimer, the term of this patent is extended or adjusted under 35 U.S.C. 154(b) by 0 days.

(21) Appl. No.: 18/712,665

(22) PCT Filed: Dec. 16, 2021

(86) PCT No.: PCT/US2021/063675
§ 371 (c)(1),
(2) Date: May 22, 2024

(87) PCT Pub. No.: WO2023/113791
PCT Pub. Date: Jun. 22, 2023

(65) Prior Publication Data
US 2025/0010593 A1      Jan. 9, 2025

(51) Int. Cl.
*B32B 27/08*       (2006.01)
*B32B 27/32*       (2006.01)
*B32B 27/34*       (2006.01)
(52) U.S. Cl.
CPC .............. *B32B 27/08* (2013.01); *B32B 27/32* (2013.01); *B32B 27/34* (2013.01); *B32B 2255/10* (2013.01); *B32B 2270/00* (2013.01); *B32B 2307/308* (2013.01); *B32B 2307/418* (2013.01); *B32B 2307/516* (2013.01); *B32B 2307/72* (2013.01); *B32B 2307/734* (2013.01); *B32B 2439/46* (2013.01); *B32B 2439/62* (2013.01)

(58) Field of Classification Search
CPC ...................................................... B29C 55/12
See application file for complete search history.

(56) References Cited

U.S. PATENT DOCUMENTS 4,452,942 A      6/1984  Shida et al.
5,698,279 A     12/1997  Vicik
                (Continued)

FOREIGN PATENT DOCUMENTS

WO          9604178        2/1996
WO     2012000739 A1       1/2012
                (Continued)

OTHER PUBLICATIONS

PCT International Search Report, International Application No. PCT/US2021/063675, issued May 19, 2022, 4 pages.
(Continued)

*Primary Examiner* — Ian A Rummel

(57) ABSTRACT

Recyclable and dimensionally stable films for packaging include an oriented base film having a first layer containing a polar polymer and a second layer containing a stabilizing polyolefin, wherein the stabilizing polyolefin is selected from the group of an ethylene/norbornene copolymer having a norbornene content greater than 20 mol %, a polyethylene polymer having a density greater than 0.94 g/cm$^3$, and a polypropylene homopolymer.

14 Claims, 7 Drawing Sheets

10 ⟶

100

(56) References Cited

U.S. PATENT DOCUMENTS

| | | |
|---|---|---|
| 8,029,893 B2 | 10/2011 | Siegel et al. |
| 8,397,914 B1 | 3/2013 | Janichek, Jr. et al. |
| 10,870,253 B2 | 12/2020 | Deplace et al. |
| 2002/0056784 A1 | 5/2002 | Davies et al. |
| 2002/0197425 A1 | 12/2002 | Wolf et al. |
| 2004/0013862 A1 | 1/2004 | Brebion et al. |
| 2004/0236024 A1 | 11/2004 | Rivett et al. |
| 2005/0140917 A1 | 6/2005 | Miura et al. |
| 2005/0233099 A1 | 10/2005 | Sasaki et al. |
| 2005/0244664 A1 | 11/2005 | Bekele et al. |
| 2006/0241235 A1 | 10/2006 | Givord et al. |
| 2010/0000031 A1 | 1/2010 | Sierakowski et al. |
| 2011/0039082 A1 | 2/2011 | Yun et al. |
| 2014/0199505 A1 | 7/2014 | Lorenzetti et al. |
| 2014/0216975 A1 | 8/2014 | Chrysanthidis |
| 2016/0107422 A1 | 4/2016 | Mcallister, Jr. |
| 2016/0193815 A1 | 7/2016 | Mitchell et al. |
| 2017/0182728 A1 | 6/2017 | Deplace et al. |
| 2017/0239920 A1 | 8/2017 | Gilbert |
| 2017/0282507 A1 | 10/2017 | Dou et al. |
| 2017/0305124 A1 | 10/2017 | German, Jr. et al. |
| 2018/0079188 A1 | 3/2018 | Grefenstein et al. |
| 2018/0345633 A1 | 12/2018 | Yuno et al. |
| 2020/0324526 A1 | 10/2020 | Berbert et al. |
| 2020/0326027 A1 | 10/2020 | Goto |
| 2020/0391489 A1 | 12/2020 | Lamtigui et al. |

FOREIGN PATENT DOCUMENTS

| | | |
|---|---|---|
| WO | 2015153794 A1 | 10/2015 |
| WO | 2016109023 A1 | 7/2016 |
| WO | 2016128865 A1 | 8/2016 |
| WO | 2017110890 A1 | 6/2017 |
| WO | 2017141969 A1 | 8/2017 |
| WO | 2020236140 A1 | 11/2020 |

OTHER PUBLICATIONS

Third Party Observations submitted in EP Application No. 18870680.8 dated Mar. 3, 2022, 3 pages.

DOW, www.dow.com/en-us/brand/retain.html, 1995-2025.

Paben, "Plastics Recycling Update", https://resource-recycling.com/plastics/2016/06/30/how-a-multi-polymer-pouch-was-engineered-for-recyclability/, 2016.

The Association of Plastic Recyclers; PE Film; retrieved online Feb. 14, 2024 at https://plasticsrecycling.org/pe-film-design-guidance.

The Association of Plastic Recyclers; ARP Design Guide for Plastics Recyclability; retrieved online Feb. 14, 2024 at https://plasticsrecycling.org/apr-design-guide.

300    322
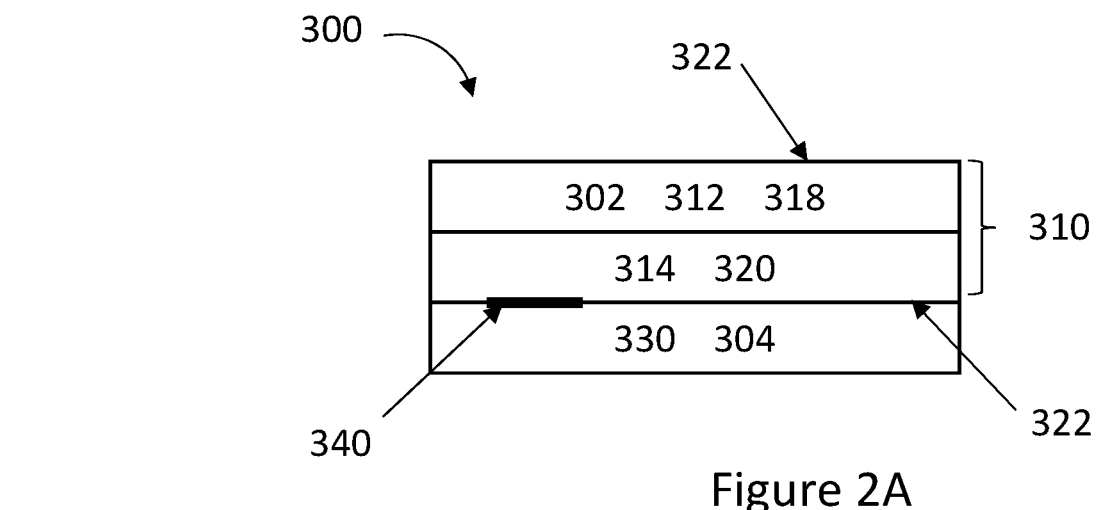
302   312   318
314   320
330   304
310
340
322
Figure 2A
400    422
402    412   418
414
416    420
430    404
410
440
422
Figure 2B
500    522
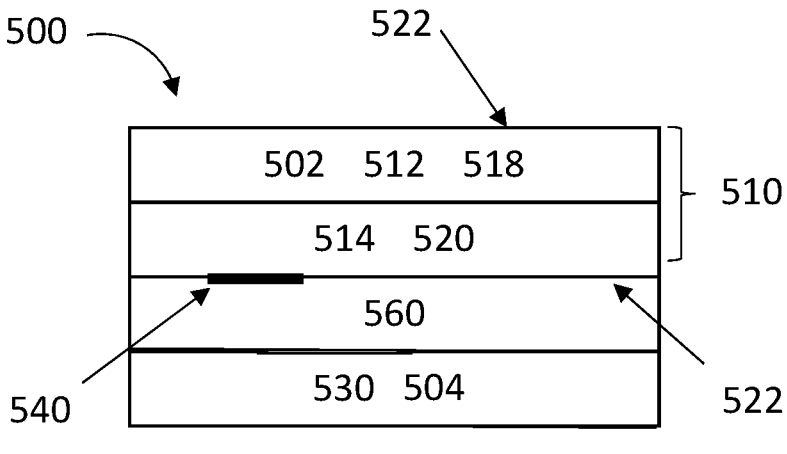
502   512   518
514   520
560
530   504
510
540
522
Figure 2C

10

10

RECYCLABLE PACKAGING FILM WITH DIMENSIONAL STABILITY

TECHNICAL FIELD

This disclosure is related to film structures, in particular oriented films and laminates useful for packaging applications.

BACKGROUND

Today, many products such as consumer goods, foods, beverages, pharmaceuticals, industrial chemicals, cleaners, cosmetics and other sensitive items are packaged in high performance packaging. This packaging provides advantages such as high barrier and hermetic seals to help protect and extend the shelf life of the packaged product. The packaging may also include features for consumer ease, such as opening or reclosing features. Materials used to manufacture these packages must endure the package formation process, package filling conditions and environmental stresses from storage, shipping and distribution. These demands are generally met by multilayer packaging that incorporates several different high-performance materials.

In many cases, high performance packaging is designed with exterior layers such as OPET (biaxially oriented polyethylene terephthalate) or BON (biaxially oriented nylon) which provide high stiffness, dimensional stability, durability and heat resistance. The use of these materials creates a film that is very difficult to recycle in available recycling streams. As a result, these packaging films are typically considered "non-recyclable" and end up in a waste stream after the package has been emptied.

All polyethylene type packaging film structures have been developed for some packaging applications to ease recyclability. However, these films and packages suffer in performance. Often the packages have poor appearance due to lack of heat resistance and low durability. These types of structures also have inefficiencies in film conversion and package conversion, thus driving the cost to manufacture higher.

Combinations of high-performance materials and polyethylene materials have been developed to help solve some of the performance issues of all-polyethylene films. In some cases, improvements have been seen in heat resistance and durability. However, these films remain difficult to convert and do not perform well in demanding applications, specifically applications that require registered print.

SUMMARY

High performance flexible packaging is designed to deliver speed, performance and cost efficiency in both the process to manufacture the packaging material and the process to manufacture a finished package. High performance packaging also provides protection to the products inside while maintaining an impressive appearance. Typically, high performance packaging materials are designed with a combination of materials to achieve these requirements. Unfortunately, this combination of materials often makes the packaging material difficult or impossible to recycle into a standard reprocessing or recycling stream. Described herein is a recyclable film having properties such that the film can be used for high performance packaging applications, without the disadvantages often experienced with currently available recyclable film.

Specifically, the recyclable films disclosed herein include an oriented base film including a layer containing a polar polymer and a layer including a stabilizing polyolefin. In this manner, the recyclable film has excellent properties with respect to heat resistance, durability and appearance due to the presence of the polar polymer containing layer. The recyclable films also have sufficient polyethylene content for recyclability and retain excellent dimensional stability, due to the presence of the stabilizing polyolefin layer. The dimensional stability is of key importance for converting the packaging film with tight tolerance print repeat, as will be discussed in detail herein.

Disclosed herein are recyclable films including an oriented base film having a first layer comprising a first polar polymer and a second layer comprising a stabilizing polyolefin, wherein the stabilizing polyolefin is selected from the group of an ethylene/norbornene copolymer having a norbornene content greater than 20 mol %, a polyethylene polymer having a density greater than 0.94 $g/cm^3$, and a polypropylene homopolymer. Advantageously, the oriented base film has a converting related strain value from 0% to 0.75%, at a temperature of 75° C. under a load of 80 N/m.

Further, the first layer of the oriented base film may have a composition including from 50% to 100% of the first polar polymer, by weight, and the first polar polymer is a polyamide, a polyester or an ethylene vinyl alcohol copolymer (EVOH). The first polar polymer may be polyamide 6/66.

Advantageously, the first layer of the oriented base film may be a first outer layer of the oriented base film. Likewise, the first layer of the oriented base film may be a first outer layer of the recyclable film.

Additionally, the recyclable film may include a sealing layer. In some embodiments of the recyclable film the first layer of the oriented base film is a first outer layer of the recyclable film and the sealing layer is a second outer layer of the recyclable film. In some embodiments of the recyclable film, the sealing layer is not oriented.

The oriented base film of the recyclable film may also include a third layer comprising a second polar polymer, wherein the second layer is between the first layer and the third layer. The first layer is a first outer layer of the oriented base film and the third layer is a second outer layer of the oriented base film.

Some embodiments of the recyclable film have a total composition including not more than 20% polar polymer.

Other features of the recyclable film may include printed indicia located on a major surface of the oriented base film and/or a barrier layer located between the first layer of the oriented base film and the sealing layer.

In some embodiments, the recyclable film consists of only the oriented base film and the oriented base film includes a sealing layer. The sealing layer is an outer layer of the oriented base film.

Another embodiment of a recyclable film includes a) an oriented base film, b) a sealing layer, and c) printed indicia located on one of the major surfaces of the oriented base film. In this embodiment, the oriented base film includes i) a first layer comprising a first polar polymer, ii) a second layer comprising a stabilizing polyolefin having a refractive index between 1.526 and 1.542, and iii) a third layer comprising a second polar polymer. The oriented base film has a free shrink value of less than 5% in both the machine direction and the transverse direction when tested according to ASTM D2732 using bath temperature of 90° C. The recyclable film may include an oriented base film that has a converting related strain value between 0% and 0.75% when measured at a temperature of 75° C. under a load of 80 N/m.

Another embodiment of a recyclable film includes a) an oriented base film, b) a sealing layer, and c) printed indicia located on one of the major surfaces of the oriented base film. In this embodiment, the oriented base film includes i) a first layer including from 50% to 100% of polyamide 6/66, ii) a second layer comprising a stabilizing polyolefin having a refractive index between 1.526 and 1.542, and iii) a third layer including from 50% to 100% of polyamide 6/66. The oriented base film has a free shrink value of less than 5% in both the machine direction and the transverse direction when tested according to ASTM D2732 using bath temperature of 90° C. The recyclable film may include an oriented base film that has a converting related strain value between 0% and 0.75% when measured at a temperature of 75° C. under a load of 80 N/m.

Another embodiment of a recyclable film includes a) an oriented base film and b) a sealing layer. The oriented base film includes i) a first layer comprising a first polar polymer, ii) a second layer comprising a stabilizing polyolefin having a refractive index between 1.526 and 1.542, and iii) a third layer comprising a second polar polymer. The first layer is a first outer layer of the oriented base film, the first layer is a first outer layer of the recyclable film, the third layer is a second outer layer of the oriented base film and the sealing layer is a second outer layer of the recyclable film. The recyclable film may further include printed indicia deposited on a major surface of the oriented base film. The recyclable film may include a sealing layer that is not oriented.

BRIEF DESCRIPTION OF THE DRAWINGS

The disclosure may be more completely understood in consideration of the following detailed description of various embodiments of the disclosure in connection with the accompanying drawings, in which:

FIG. 2A is a cross sectional view of an embodiment of a recyclable film,

FIG. 2B is a cross sectional view of an embodiment of a recyclable film,

FIG. 2C is a cross sectional view of an embodiment of a recyclable film,

Figure 1A:
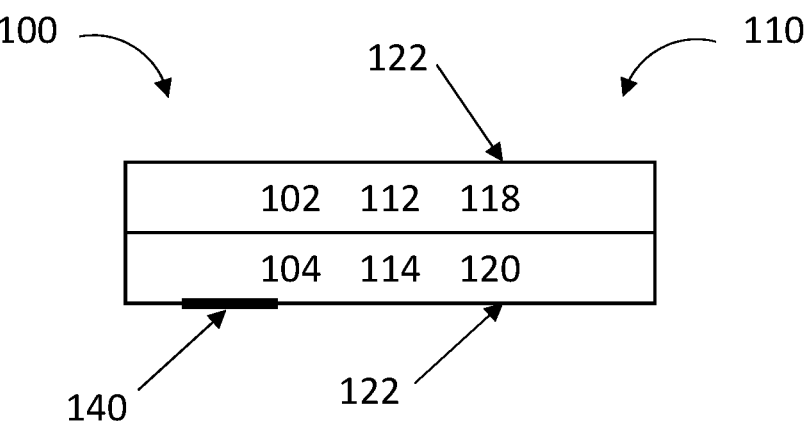
FIG. 1A is a cross sectional view of an embodiment of an oriented base film.

The drawings show some but not all embodiments. The elements depicted in the drawings are illustrative and not necessarily to scale, and the same (or similar) reference numbers denote the same (or similar) features throughout the drawings.

DETAILED DESCRIPTION

By specifically designing the materials and structure of a film as described herein, the inventors have developed a highly advantageous film that can be used for packaging applications, especially those that are printed for packaging applications. The films have a unique structure and combination of materials that deliver superior performance in a recyclable film. The films mimic a combination of performance characteristics typically only seen with non-recyclable films, including heat resistance, durability and dimensional stability.

One of the key features of the films disclosed herein is one or more layers containing polar polymers such as EVOH, polyamide or polyester. The inclusion of this layer provides for good heat resistance. The heat resistance is critical for converting the film into packaging. Specifically, the heat resistance of the film prevents the film from sticking to hot surfaces of the packaging equipment, allowing the equipment to run at high run speeds. The additional heat resistance provided by the polar polymer containing layer is critical to maintain productivity during the packaging process when transitioning from non-recyclable films to recyclable films. The additional heat resistance provided by the polar polymer containing layer provides an advantage over current recyclable films not containing polar polymers (i.e. all-polyolefin based recyclable film structures) because packaging line speeds can be increased. The inclusion of the polar polymer containing layer can also provide durability advantages (i.e. puncture strength, abrasion resistance, etc.) as compared to all-polyolefin based recyclable films.

Another key feature of the films disclosed herein is one or more layers containing at least one stabilizing polyolefin in combination with the polar polymer containing layer. A number of different polyolefins can act as a stabilizing polyolefin, as will be described below. The function of the combination of the stabilizing polyolefin containing layer and the polar polymer containing layer is to provide a critical advantage in dimensional stability. The increased dimensional stability allows converters to hold tight repeat tolerances in printed designs which are critical for many packaging applications.

Current recyclable films fall into two categories. One type of recyclable film is made with all-polyolefin materials. Films made with all polyolefin materials can typically be converted (i.e. printed, laminated, etc.) with minor processing adjustments as compared to films made with non-recyclable materials. However, the all-polyolefin structures present a major problem when being run on packaging lines due to their inherent lack of heat resistance. Often the lack of heat resistance causes major decreases in line-speed and/or increases in downtime. A second type of recyclable film includes small amounts of polar polymers. Some of these recyclable films, such as those that utilize nylon 6,66, retain a suitable amount of heat resistance, but often become very challenging to convert. The combination of polar polymer and polyolefin create films that lack suitable dimensional stability. The lack of dimensional stability prevents converters from achieving consistent print repeat tolerances as the films are printed and laminated. The heat and speed of typical converting operations stretches the films if they do not have enough resistance to web tension (i.e. dimensional stability).

As used herein, the term "recyclable" and "recyclable film" refer to films that are generally recyclable in a polyolefin-based recycling stream. Examples of recyclable films may contain a high amount of polyolefin, such as more than 80% polyolefin, more than 85% polyolefin, more than 90% polyolefin or more than 95% polyolefin, by weight. Examples of recyclable films may contain a high amount of polyethylene, such as more than 80% polyethylene, more than 85% polyethylene, more than 90% polyethylene or more than 95% polyethylene, by weight. Examples of recyclable films may contain a high amount of polypropylene, such as more than 80% polypropylene, more than 85% polypropylene, more than 90% polypropylene or more than 95% polypropylene, by weight. Examples of recyclable films may contain relatively low amounts of polar polymers, such as less than 20%, less than 15%, less than 10% or less than 5% polar polymers, by weight. Examples of recyclable films may contain relatively low amounts of polyamide, such as less than 20%, less than 15%, less than 10% or less than 5% polyamide, by weight. Examples of recyclable films may contain relatively low amounts of EVOH, such as less than 20%, less than 15%, less than 10% or less than 5% EVOH, by weight. An example of a non-recyclable film includes a film structure such as 60 ga biaxially oriented polyamide/adhesive/2 mil polyethylene sealant, which includes approximately 25% polyamide, by weight.

As used herein, a "polyolefin" or "polyolefin polymer" is a polyethylene or a polypropylene. As used herein, a "stabilizing polyolefin" specifically refers to a polyolefin polymer that contributes physical properties such as dimensional stability. Examples of stabilizing polyolefins include ethylene/norbornene copolymer (a type of cyclic olefin copolymer, COC) having a norbornene content greater than 20 mol %, polyethylene polymer having a density greater than 0.94 g/cm³ (see HDPE definition below) or polypropylene homopolymer. It is believed that these three stabilizing polyolefins differ in the method by which the polymer provides for the stabilizing characteristics, which may include overall crystallinity, density, or alicyclic ring effects.

Stabilizing polyolefins can also be defined by their refractive index. The same structural features that influence film stiffness and dimensional stability (e.g., chain flexibility, crystallinity) also impact a polymer's opto-electronic properties, such as refractive index. Refractive index (Index of Refraction) is a value calculated from the ratio of the speed of light in a vacuum to that in a second medium of greater density and can be measured by ASTM D542. It has been found that stabilizing polyolefins having a refractive index between 1.526 and 1.542 have suitable properties to improve dimensional stability of the oriented base film and the recyclable film. Table 1 below shows the refractive index of several polyolefins, including several examples of stabilizing polyolefins.

TABLE 1

Refractive Index of Various Polyolefins

| Polyolefin | Refractive Index | Stabilizing Polyolefin? (RI = 1.526 to 1.542) |
|---|---|---|
| PE, density 0.902 g/cm³ | 1.500 | No |
| PE, density 0.918 g/cm³ | 1.510 | No |
| PE, density 0.93 g/cm³ | 1.520 | No |
| PE, density 0.94 g/cm³ | 1.526 | Yes |
| PE, density 0.96 g/cm³ | 1.539 | Yes |
| COC with norbornene content of 17% | 1.524 | No |
| COC with norbornene content of 33% | 1.530 | Yes |
| COC with norbornene content of 55% | 1.537 | Yes |

Polyethylene is the name for a polymer whose basic structure is characterized by the chain —(CH₂—CH₂—)ₙ. As used herein, the term "polyethylene" includes homopolymers and copolymers of ethylene. Polyethylene homopolymer is generally described as being a solid which has a partially amorphous phase and partially crystalline phase with a density of between 0.900 g/cm³ to 0.970 g/cm³. The relative crystallinity of polyethylene is known to affect its physical properties. The amorphous phase imparts flexibility and high impact strength while the crystalline phase imparts a high softening temperature and rigidity.

There are several broad categories of polymers and copolymers referred to as "polyethylene." Placement of a particular polymer into one of these categories of polyethylene is frequently based upon the density of the polyethylene and often by additional reference to the process by which it was made since the process often determines the degree of branching, crystallinity and density. In general, the nomenclature used is nonspecific to a compound but refers instead to a range of compositions. This range often includes both homopolymers and copolymers.

"High density polyethylene" (HDPE) is ordinarily used in the art to refer to both (a) homopolymers of densities between about 0.960 g/cm³ to 0.970 g/cm³ and (b) copolymers of ethylene and an α-olefin (usually 1-butene or 1-hexene) which have densities between 0.940 g/cm³ and 0.958 g/cm³. HDPE includes polymers made with Ziegler or Phillips type catalysts and is also said to include high molecular weight polyethylene. High density polyethylene that may be useful as a stabilizing polyolefin may have a density greater than 0.94 g/cm³ or a density between 0.940 g/cm³ and 0.970 g/cm³.

As used throughout this application, the term "ethylene/norbornene copolymer" refers to a class of polymeric materials based on cyclic olefin monomers and ethane. Ethylene/norbornene copolymers are known commercially as cyclic olefin copolymers, "COC", with one or more different cyclic olefin units randomly or alternately attached to the ethylene polymer backbone. In general, COCs exhibit a relatively high glass transition temperature (greater than 50° C.), optical clarity, low heat shrinkage, low moisture absorption and low birefringence. Ethylene/norbornene copolymer that may be useful as a stabilizing polyolefin may have a norbornene content greater than 20 mol %.

As used throughout this application, the term "polypropylene" refers to a plastomer, homopolymer or copolymer having at least one propylene monomer linkage within the repeating backbone of the polymer. The propylene linkage can be represented by the general formula: $[CH_2—CH(CH_3)]_n$. Such polypropylene may be a polypropylene impact copolymer, a polypropylene random copolymer or a polypropylene homopolymer, may be syndiotactic or isotactic and/or may or may not be clarified.

As used herein, the term "polar polymer" is used to denote a polymer formed from at least one monomer that comprises at least one heteroatom, such as oxygen (O), nitrogen (N), phosphorus (P) or sulfur (S). Non-limiting examples of polar polymers that are typically used in packaging applications are polyamide, polyester and ethylene vinyl alcohol copolymers. A layer may contain more than one polar polymer. In addition to the polar polymer, the polar layer may contain other materials such as other polymers or additives, such as slip or antiblock.

In some embodiments, the polar polymer may be a polyamide. The term "polyamide" refers to a high molecular weight polymer having amide linkages which occur along the molecular chain and includes "nylon" resins which are well known polymers having a multitude of uses including utility in packaging films. Examples of polyamides include nylon homopolymers and copolymers such as nylon 4,6 (poly(tetramethylene adipamide)), nylon 6 (polycaprolactam), nylon 6,6 (poly(hexamethylene adipamide)), nylon 6,9 (poly(hexamethylene nonanediamide)), nylon 6,10 (poly (hexamethylene sebacamide)), nylon 6,12 (poly(hexamethylene dodecanediamide)), nylon 6/12 (poly(caprolactam-co-dodecanediamide)), nylon 6,6/6 (poly(hexamethylene adipamide-co-caprolactam)), nylon 66/610 (e.g., manufactured by the condensation of mixtures of nylon 66 salts and nylon 610 salts), nylon 6/69 resins (e.g., manufactured by the condensation of epsilon-caprolactam, hexamethylenediamine and azelaic acid), nylon 11 (polyundecanolactam), nylon 12 (polylauryllactam) and copolymers or mixtures thereof.

Polyamide is used in films for food packaging and other applications because of its unique physical and chemical properties. Polyamide is selected as a material to improve temperature resistance, abrasion resistance, puncture strength and/or barrier of films. Properties of polyamide-containing films can be modified by selection of a wide variety of variables including copolymer selection, and converting methods (e.g. coextrusion, orientation, lamination, and coating).

In some embodiments, the polar polymer is a polyester. As used herein, the term "polyester" refers to a synthetic homopolymer or copolymer having ester linkages between monomer units. Suitable polyesters for the base film may be chosen among aliphatic polyesters or semi-aromatic polyesters obtained by polycondensation of one or more suitable dicarboxylic acids and one or more suitable diols, or of one or more hydroxylated carboxylic acids. Suitable dicarboxylic acids constituting the polyester may include terephthalic acid, isophthalic acid, phthalic acid, 5-tert-butylisophthalic acid, naphthalene dicarboxylic acid, diphenyl ether dicarboxylic acid, cyclohexane-dicarboxylic acid, adipic acid, oxalic acid, malonic acid, succinic acid, agelaic acid, sebacic acid, and dimer acids comprising dimers of unsaturated fatty acids, which may be used singly or in combination of two or more species. Suitable diols constituting the polyester may include ethylene glycol, propylene glycol, tetramethylene glycol, neopentyl glycol, hexamethylene glycol, diethylene glycol, polyalkylene glycol, 1,4-cyclohexane-dimethanol, 1,4-butanediol, and 2-alkyl-1,3-propane diol which may be used singly or in combination of two or more species. Preferred polyesters for the polyester layer include polyethylene terephthalate (PET), polyethylene terephthalate glycol (PETG), polybutylene terephthalate (PBT), polyethylene naphthalate (PEN), polyethylene isophthalate (PEI), poly-cycloterephthalate (PCT), and polytriethylene terephthalate (PTT). Commercial examples of suitable polyesters include Eastapak™ Polyester 9921, Eastar™ Copolyester 6763, Tritan™ Copolyester FX100, and Eastobond™ Copolyester 19412, all available from Eastman Chemical Company, Kingsport, Tennessee, Laser+D C9921 available from DAK Americas, and Polyclear™ Crystal™ PET 3302.

In some embodiments, the polar polymer is ethylene vinyl alcohol copolymer (EVOH). As used herein, "EVOH" refers to ethylene vinyl alcohol copolymer. EVOH is otherwise known as saponified or hydrolyzed ethylene vinyl acetate copolymer and refers to a vinyl alcohol copolymer having an ethylene comonomer. EVOH is prepared by the hydrolysis (or saponification) of an ethylene vinyl acetate copolymer. The degree of hydrolysis is preferably from about 50 to 100 mole percent, more preferably from about 85 to 100 mole percent, and most preferably at least 97%. It is well known that to be a highly effective oxygen barrier, the hydrolysis-saponification must be nearly complete, i.e., to the extent of at least 97%. EVOH is commercially available in resin form with various percentages of ethylene. It is expected that processability and orientation would be facilitated at higher ethylene contents; however, gas permeabilities, particularly with respect to oxygen, may become undesirably high for certain packaging applications which are sensitive to microbial growth in the presence of oxygen. Conversely, lower ethylene content may have lower gas permeabilities, but processability and orientation may be more difficult. In some embodiments, ethylene-vinyl alcohol copolymers comprise from about 27-48 mole % ethylene, 27-44 mole % ethylene, or even 27-29 mole % ethylene. EVOH may be further optimized by blending, special copolymerization or cross-linking to be more heat resistant or enhance other properties.

As noted, a critical characteristic of the recyclable films described herein is good dimensional stability. The criticality of dimensional stability is evident when the films are being converted into packaging films. During the converting, one or more high speed roll-to-roll web-based processes are used such as, but not limited to, flexographic printing, rotogravure printing, adhesive lamination, extrusion lamination, extrusion coating, laser scoring, die cutting, slitting and rewinding. The processes often include elevated temperature environments, such as those used for extrusion or ink/adhesive application. In addition to elevated temperatures, the processes also include machine direction tension (i.e. the films being converted are held under tension). Under the converting conditions that include elevated temperatures and tension, some polymer-based films experience stretching, an increase in length or area, and some polymer-based films experience shrinking, a decrease in length or area. Dimensional stability is a term to describe the relative amount of planar displacement (stretching or shrinking) a film displays. A film with good dimensional stability displays a low or very low amount of planar displacement under converting conditions. The propensity of a film to undergo planar displacement when exposed to heat and tension that may be present during film converting is referred to as dimensional stability. Lower planar displacement is referred to as better dimensional stability. Higher planar displacement is referred to as poor dimensional stability.

The lack of planar displacement, or good dimensional stability, is particularly important when converting films that include register printing. As is often the case for flexible packaging, films may be printed in a repeated fashion. The repeating of the printed image may be across the web (in the transverse direction) and along the web (in the machine direction). Images repeated in the machine direction are measured by print repeat, which is the length of one or more print images in the machine direction. The print repeat must be held within a certain tolerance during printing and any subsequent converting processes. Print repeat tolerances are typically less than 1%. In other words, the machine direction distance between printed patterns varies by less than 1%.

Dimensional stability can be characterized and quantified by analyzing the stretch of a film at elevated temperatures. During the development of the recyclable films disclosed herein, the inventors found that the dimensional stability of films can be characterized by a property defined as "converting related strain value". The converting related strain value is a useful measurement for predicting the outcome of converting a film having a tight print repeat tolerance.

Figure 8:
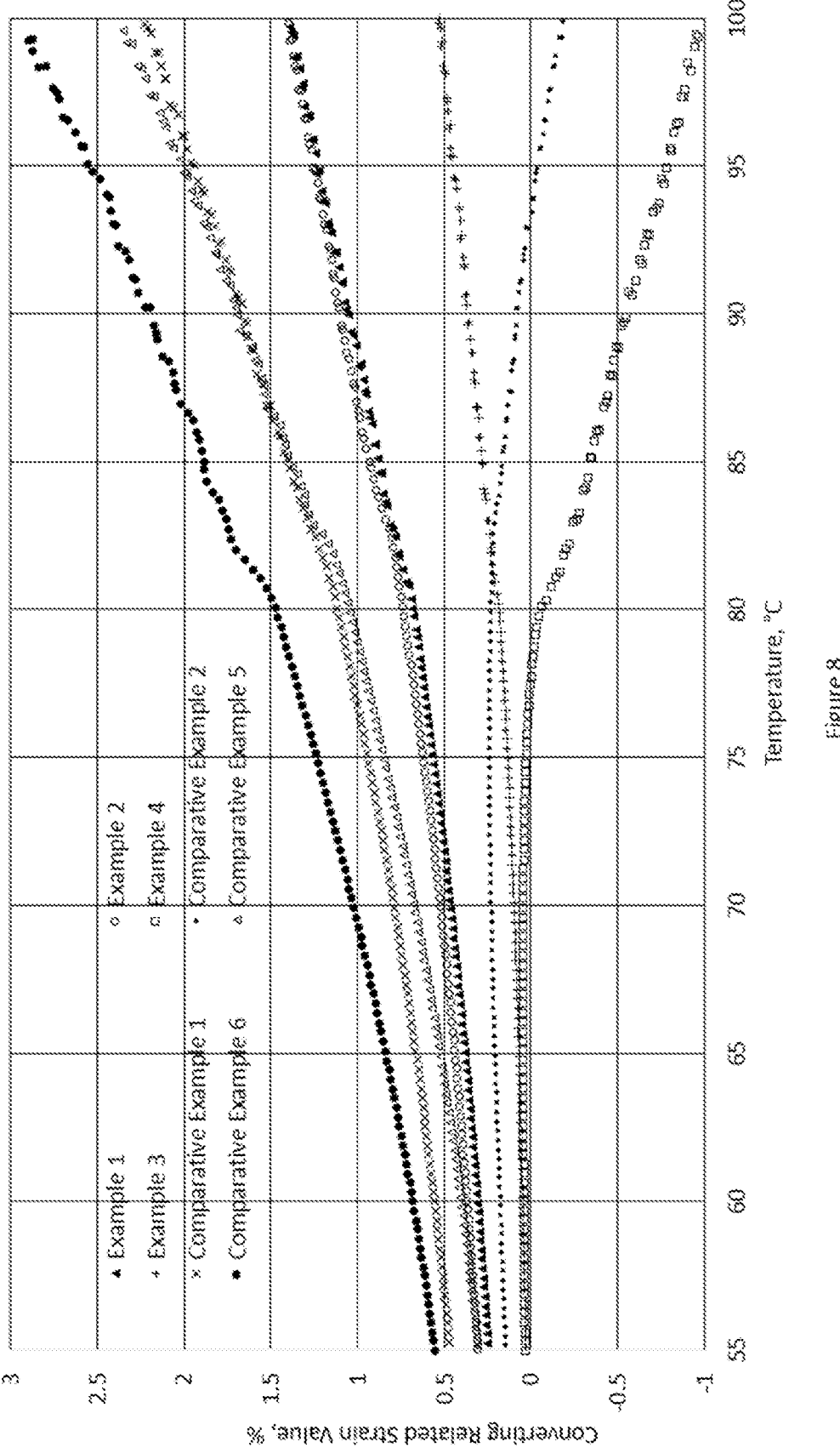
FIGS. 8 and 9 are plots of Converting Related Strain Value (%) data for various oriented base film embodiments and comparative films.
Figure 9:
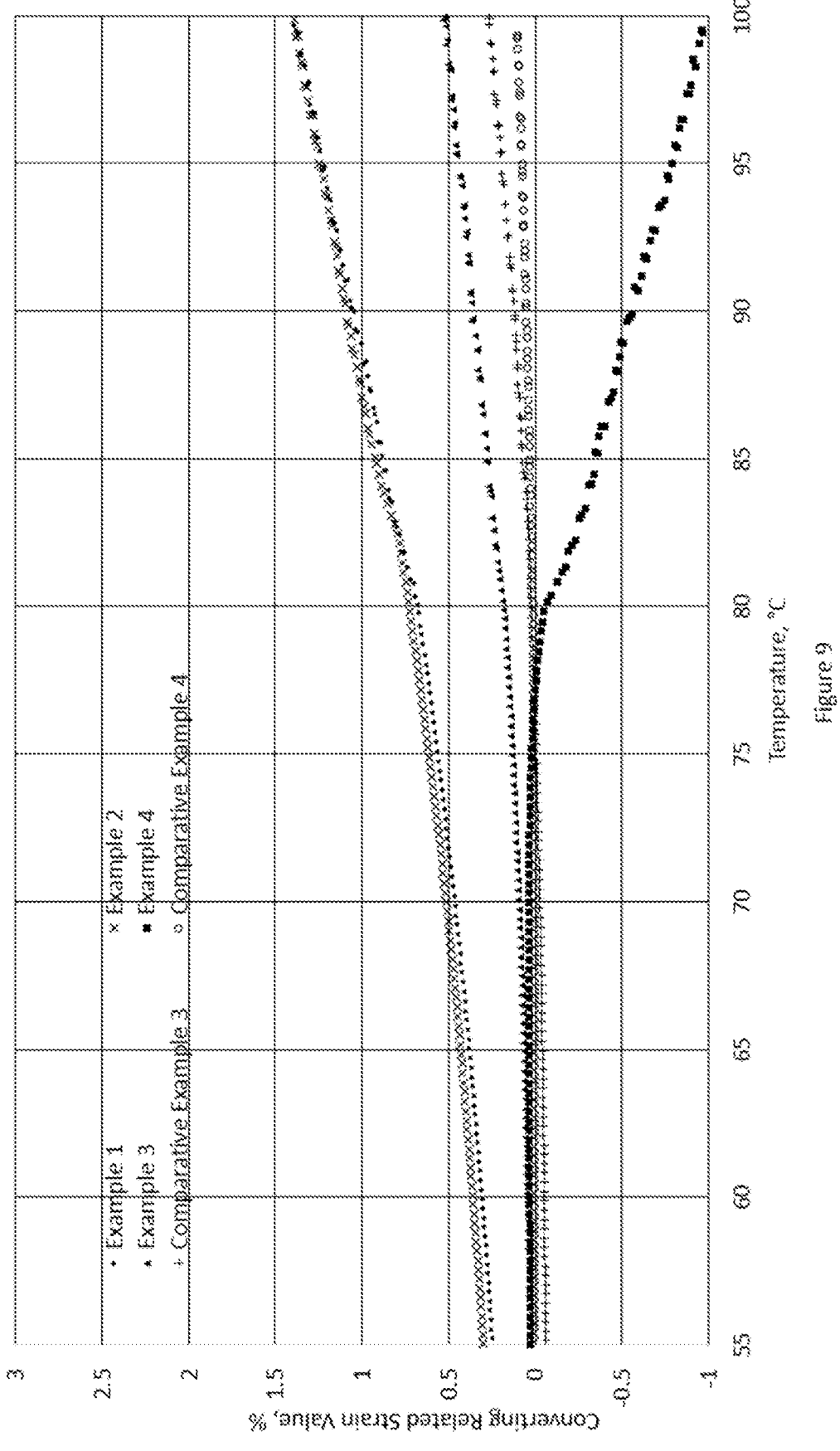

As defined herein, "converting related strain value" is measured using a Thermomechanical Analysis (TMA) procedure as defined here. DMA/TMA test equipment is used for the procedure such as TA Instruments Q800 DMA. The testing is set up to measure deformation under a controlled tension force (non-oscillating) over a temperature range. A 6.3 mm wide film sample is cut and loaded into the tension clamps with an approximate distance of 12.5 mm between the clamps. The film is cut and clamped such that the force is applied in the machine direction of the film. A preload force of 0.504 N is applied to the sample and the initial distance is recorded. The equipment is then equilibrated to 35° C. To execute the test, the temperature is ramped at a speed of 10° C./minute from 35° C. to 130° C., while a constant force of 0.504 N is applied. The temperature ramping speed and force applied have been selected to closely mimic the conditions a web might experience on converting equipment. During the test, the displacement of the clamps (i.e. the stretching or shrinking of the film) is measured. The strain % is then calculated and reported as a function of temperature, resulting in a converting related strain value curve. Examples of converting related strain value curves are shown in FIGS. 8 and 9. Strain % is the displacement distance divided by the initial distance.

The inventors have found several useful correlations between the dimensional stability of a film during converting and the converting related strain value. At 75° C., the converting related strain value should be between 0% and 0.75%. At 65° C., the converting related strain value should be between 0% and 0.5%. At 85° C., the converting related strain value should be between 0% and 1.25%.

An example of a recyclable film is shown in FIG. 1A. Here the recyclable film 100 is made of an oriented base film 110 having a first layer 112 and a second layer 114. In this embodiment, the first layer 112 is also the first outer layer 118 of the oriented base film 110 and the first outer layer 102 of the recyclable film 100. Likewise, the second layer 114 is also the second outer layer 120 of the oriented base film 110 and the second outer layer 104 of the recyclable film 100. Also shown in FIG. 1A is printed indicia 140 deposited on a major surface 122 of the oriented base film 110. If printed indicia is deposited on an exterior/outer surface of the oriented base film, an over lacquer (OL) may be deposited over the top of the ink, protecting it from scuffing and other damage.

Figure 1B:
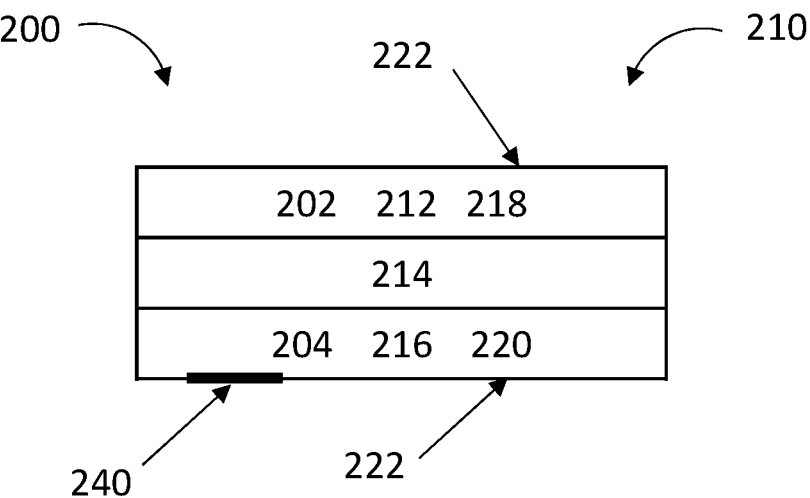
FIG. 1B is a cross sectional view of an embodiment of an oriented base film.

Another example of a recyclable film is shown in FIG. 1B. In this example, the recyclable film 200 is made of an oriented base film 210 having a first layer 212, a second layer 214 and a third layer 216, with the second layer 214 positioned between the first layer 212 and the third layer 216. In this embodiment, the first layer 212 is also the first outer layer 218 of the oriented base film 210 and the first outer layer 202 of the recyclable film 200. Likewise, the third layer 216 is also the second outer layer 220 of the oriented base film 210 and the second outer layer 204 of the recyclable film 200. Also shown in FIG. 1B is printed indicia 240 deposited on a major surface 222 of the oriented base film 210.

The base film of the recyclable film is oriented and annealed such that the base film has a free shrink value of less than 5% in both the machine direction and the transverse direction when tested according to ASTM D2732 using bath temperature of 90° C. In some embodiments, the oriented base film may have a free shrink value of less than 4%, less than 3% or less than 2% in both the machine direction and the transverse direction when tested according to ASTM D2732 using bath temperature of 90° C. The base film may have been oriented such that the machine direction elongation at break of the base film is less than 100%.

The recyclable films, as well as packages and/or containers including such films, preferably have seal strength, thermal stability, and heat resistance properties that allow them to be subjected to heat sealing conditions without loss of desired functional and visual characteristics. Recyclable films that contain base films that contain polar polymers and are oriented and annealed show improved properties with respect to heat resistance, appearance and overall performance as compared to other recyclable films.

Production of the oriented base film requires at least the conversion processes of extrusion, orientation and annealing. These processes, in combination with raw material selection, can impart critical properties such as heat resistance, dimensional stability and durability. Additionally, the film can be more cost effective than un-oriented materials or oriented materials made from a single polymer.

The layers of the oriented base film can be extruded either in combination (coextrusion) or separately. If done separately, the layers can be combined by known methods of lamination including adhesive lamination or extrusion lamination. Alternatively, layers of the base film can be added by extrusion coating, solution coating, or any other known converting method. A combination of extrusion and lamination processes may be used to manufacture the oriented base film. The oriented base film, or any layers of the oriented base film, may be extruded using either flat or annular die type processes.

After all the layers of the oriented base film have been assembled, orientation of the film is performed. Orientation may be mono-directional (machine direction or transverse direction), or bi-directional stretching of the film, increasing the machine direction and/or transverse direction dimension and subsequently decreasing the thickness of the material. Bi-directional orientation may be imparted to the film simultaneously or successively. Stretching in either or both directions is subjected to the film in the solid-phase at a temperature just below the melt temperature of the polymers in the film. In this manner, the stretching causes the polymer chains to "orient", changing the physical properties of the film. At the same time, the stretching thins the film. The resulting films are thinner and can have significant changes in optical properties and mechanical properties such as toughness, heat resistance, stiffness (i.e. modulus), tear strength and barrier.

The amount of orientation imparted on the oriented base film can affect the properties thereof. It has been found that in the case of a machine direction oriented base film, stretching of at least 2× (2 times) leads to optimal film properties, such as stiffness and appearance. However, in some embodiments the oriented base film may be stretched to a level less than 2×. In other embodiments the base film may be machine direction stretched at least 2.5×, 3.0×, 3.5×, 4×, 5×, 6×, any value in between these, or more. In other words, the dimension of the film is increased 2 times the original length, increased 2.5 times the original length, etc. Biaxially oriented base films may be stretched at similar levels as mono-oriented films, through either a tenter-frame process (flat die) or a bubble process (tubular die).

Also important to the properties of the oriented base film is the annealing process. After orientation, the films have an embedded stress. Upon heating the film, this stress may be released, causing the films to shrink back to their original, pre-orientation, size. This may be problematic when applying heat to the oriented base film during the process of heat sealing the recyclable film in a packaging application. Shrinkage of the base film at this point will result in a poor appearance in the heat seal area of the package. Additionally, a film that exhibits shrink under heat conditions will be very difficult to apply printed indicia, as this process generally uses high temperatures. The process of annealing can help alleviate the embedded stress caused by orientation and the film will be "heat set" such that it will not shrink back to the original size at lower operating temperatures. It has been found that annealing the film at a temperature of about 120° C. using annealing rollers, results in a base film that can be converted easily (printed/laminated/etc.) and is capable of being part of a recyclable film that can be heat sealed to other packaging components without detrimental visual effects.

The oriented base film may be oriented and annealed in line. The base film may be biaxially oriented and annealed in line using known processes, such as the triple bubble process. The base film may be coextruded on a flat die system with machine direction orientation and annealing in-line. The base film may be coextruded on a flat dies system and machine direction stretched followed by transverse direction stretched (i.e. tenter frame orientation process) and annealed in-line. Alternatively, the processes of orientation and annealing may be done in separate processes. Annealing is typically accomplished in-line through high diameter rollers set up at temperatures a few degrees lower than the melting point of the polymer or blend of polymers present in the film. However, annealing can be done by any known means including hot air or infrared heating.

The oriented base film may have any overall thickness. Oriented base films may have a thickness from 0.5 mil (12.7 micron) to 10.0 mil (254 micron) or the thickness of the oriented base film may be from 1.0 mil (25.4 micron) to 5.0 mil (127 micron).

The term "layer", as used herein, refers to a building block of films that is a structure of a single material type or a homogeneous blend of materials. A layer may be a single polymer, a blend of materials within a single polymer type or a blend of various polymers, may contain metallic materials and may have additives. Layers may be continuous with the film or may be discontinuous or patterned. Both layers and films have a relatively insignificant thickness (z-direction) as compared to the length and width (x-y direction). All layers and films have two major surfaces, opposite each other, defined by the x-y plane. Reference to "outer layer" as used herein refers to the layers of a film that are on either major surface of the film, i.e. the layers that are not between two other layers of that film. FIGS. 1A and 1B show the major surfaces 122,222 of the oriented base film 110,210. Reference to "inner layer" as used herein refers to the layers of a film that do not have an exposed surface. Each major surface of an inner layer is adjacent to another layer of that film.

The first layer of the oriented base film includes a polar polymer. The first layer is made of at least 50% polar polymer, or more than 70%, more than 80%, more than 90% or more than 95% polar polymer. The first layer may comprise a composition including between 50% and 100% of a polar polymer, or between 75% and 100% of a polar polymer. The composition of the first layer may include a blend of more than one polar polymer. The composition of the first layer may include non-polar polymers.

The first layer of the oriented base film may be an outer layer of the oriented base film. The first layer of the oriented base film may be an outer layer of the recyclable film. The first layer may form one of the major surfaces of the oriented base film. In this position, the polar polymer of the first layer provides excellent heat resistance and durability to the recyclable film.

The first layer of the oriented base film may have a thickness between 0.6 and 5.0 microns.

The second layer of the oriented base film includes a stabilizing polyolefin. Preferably, the second layer is made of at least 50% stabilizing polyolefin, or more preferably more than 70%, more than 80%, more than 90% or more than 95% stabilizing polyolefin. The second layer may comprise a composition including between 50% and 100% of a stabilizing polyolefin. The second layer may comprise a composition including between 75% and 100% of a stabilizing polyolefin. The composition of the second layer may comprise a blend including more than one stabilizing polyolefin.

The second layer of the oriented base film may be adjacent to or directly adjacent to the first layer of the oriented base film. The second layer may be attached to the first layer. As used herein, the term "adjacent" means that the items are near each other, with or without intervening material, such as adhesive. As used herein, the term "directly adjacent" means that the items are near each other, without intervening material.

The second layer of the oriented base film may have a thickness between 8 and 40 microns.

The oriented base film may also include a third layer. The third layer of the oriented base film includes a polar polymer. Preferably, the third layer is made of at least 50% polar polymer, or more preferably more than 70%, more than 80%, more than 90% or more than 95% polar polymer. The third layer may comprise a composition including between 50% and 100% of a polar polymer, or between 75% and 100% of a polar polymer. The composition of the third layer may include a blend of more than one polar polymer. The composition of the third layer may include non-polar polymers. The composition of the third layer may be identical to or different from the first layer.

The third layer of the oriented base film may be an outer layer of the oriented base film. The third layer of the oriented base film may be an outer layer of the recyclable film. The third layer may form one of the major surfaces of the oriented base film.

The third layer of the oriented base film may have a thickness between 0.6 and 5.0 microns.

The oriented base film may include additional layers such as, but not limited to, adhesive layers (i.e. tie layers). As used herein "adhesive", "adhesive layers" or "adhesive coatings" are positioned between two films or layers to maintain the two materials in position relative to each other and prevent undesirable delamination. Unless otherwise indicated, an adhesive layer can have any suitable composition that provides a desired level of adhesion with the one or more surfaces in contact with the adhesive layer material.

Figure 4:
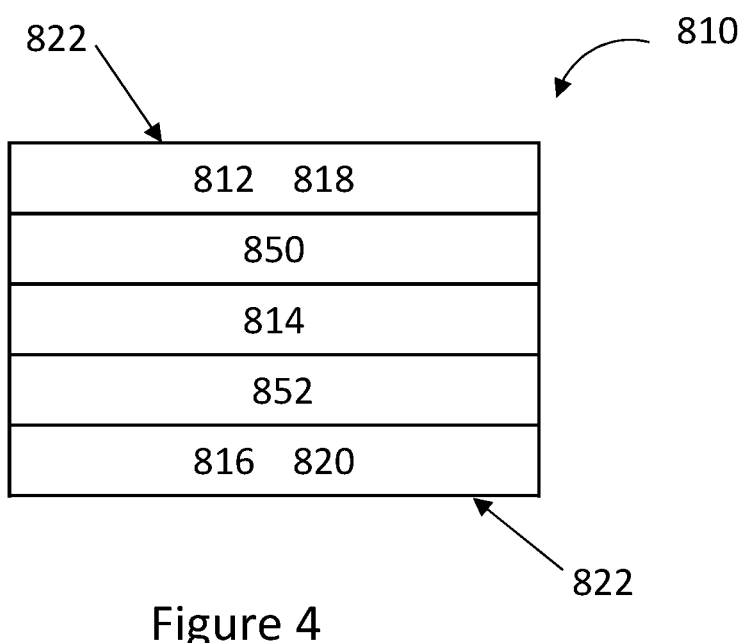
FIG. 4 is a cross sectional view of an embodiment of an oriented base film.
Figure 5:
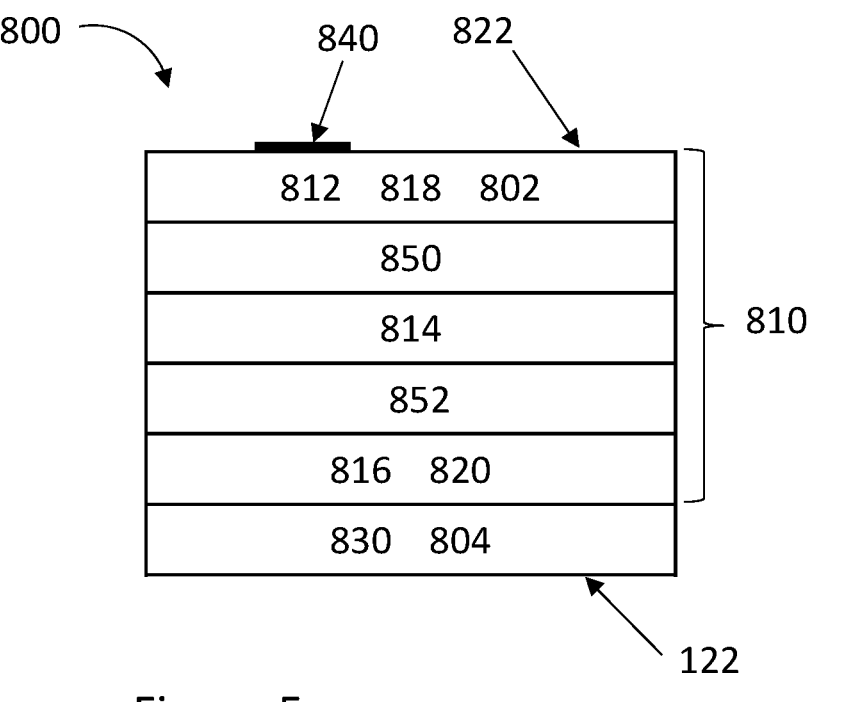
FIG. 5 is a cross sectional view of an embodiment of a recyclable film.

An embodiment of an oriented base film 810 that includes additional layers 850, 852 is shown in FIG. 4. In this embodiment, the first layer 812 is the first outer layer 818 of the oriented base film 810 and the third layer 816 is the second outer layer 820 of the oriented base film 810. The second layer 814 containing the stabilizing polyolefin is between the first layer 812 and the third layer 816. The additional layer 850 is located between the second layer 814 and the first layer 812. The additional layer 852 is located between the third layer 816 and the second layer 814. The embodiment shown in FIG. 4 may be produced by simultaneously coextruding each of the layers together, in either a blown film or cast film process, and subsequently orienting the film. Additional layers 850 and 852 may comprise a polymeric adhesive such as a polyethylene grafted with maleic anhydride functional groups. One or both of the major surfaces 822 of the oriented base film 810 may be coated with another material such as a barrier layer or printed indicia. The printed indicia may be applied in a stepped and repeated pattern, having a print repeat tolerance. As shown in FIG. 5, oriented base film 810 may be used to make recyclable film 800. In this embodiment sealing layer 830 has been attached to the oriented base film 810 and printed indicia 840 has been deposited on the surface 822 of the oriented base fil 810. The first layer 812 of the oriented base film 810 is the first outer layer 802 of the recyclable film 800 and the sealing layer 830 is the second outer layer 804 of the recyclable film 800.

The composition of any additional layers of the oriented base film may include polyolefins. In some embodiments, the composition of the oriented base film includes polar polymers in the first and third layers, if present, and non-polar polymers in the second layer and any additional layers, if present. In some embodiments, the composition of the oriented base film includes polar polymers in the first and third layers, if present, and polyolefin polymers in the second layer and any additional layers, if present. In some embodiments, the composition of the oriented base film includes polar polymers in the first and third layers, if present, and polyethylene polymers in the second layer and any additional layers, if present. In some embodiments, the composition of the oriented base film includes 100% polar polymers in the first and third layers, if present, and 100% non-polar polymers in the second layer and any additional layers, if present. In some embodiments, the composition of the oriented base film includes 100% polar polymers in the first and third layers, if present, and 100% polyolefin polymers in the second layer and any additional layers, if present. In some embodiments, the composition of the oriented base film includes 100% polar polymers in the first and third layers, if present, and 100% polyethylene polymers in the second layer and any additional layers, if present.

The recyclable film may advantageously include an outer layer that is a sealing layer. As used herein, a "sealing layer" or "sealing material" or "sealant" provides for the bonding to another film or packaging component by way of a heat sealing process (i.e. a process that uses heat and pressure to soften a sealing material to the point at which it will adhere) or a cold sealing process (i.e. a process that uses pressure to bond two surfaces containing the sealing material). The sealing layer of the recyclable film may be a polymeric based film, manufactured in a separate process, and subsequently adhered to the oriented base film. Alternatively, a sealing layer may be extruded and simultaneously attached to the base film in an extrusion coating type operation. A sealing layer may be applied as a coating (i.e. a heat seal coating) and the sealing layer may be applied in a discontinuous pattern. Sealing layers may be incorporated into a monolayer or multilayer film and may be produced by any known process. Ideally, the sealing layer has not been oriented and has no embedded stress (i.e. the sealant film has zero or near zero free shrink). Alternatively, the sealing layer may be oriented, as well as fully or partially annealed. The sealing layer may be an outer layer of the oriented base film. Examples of recyclable film structures that incorporate a sealing layer are shown in FIGS. 2A, 2B, 2C, 3A, and 3B

FIG. 2A shows an embodiment of a recyclable film 300 that includes an oriented base film 310 and a sealing layer 330. The oriented base film 310 includes a first layer 312 which is the first outer layer 318 of the oriented base film 310 and the first outer layer 302 of the recyclable film 300. The oriented base film 310 includes a second layer 314 which is the second outer layer 320 of the oriented base film 310. Printed indicia 340 is shown located on the surface 322 of the oriented base film 310. Adjacent to the second outer layer 320 of the oriented base film 310 is the sealing layer 330. The sealing layer 330 is the second outer layer 304 of the recyclable film 300.

FIG. 2B shows an embodiment of a recyclable film 400 that includes an oriented base film 410 and a sealing layer 430. In this embodiment, the oriented base film 410 includes a third layer 416 which is the second outer layer 420 of the oriented base film 410. The oriented base film 410 includes a first layer 412 which is the first outer layer 418 of the oriented base film 410 and the first outer layer 402 of the recyclable film 400. The oriented base film 410 includes a second layer 414 which is located between the first layer 412 and the third layer 416. Printed indicia 440 is shown located on the surface 422 of the oriented base film 410. Adjacent to the second outer layer 420 of the oriented base film 410 is the sealing layer 430. The sealing layer 430 is the second outer layer 404 of the recyclable film 400.

In the embodiments shown in FIGS. 2A and 2B, the sealing layer of the recyclable film is not part of the oriented base film. The sealing layer is attached to the oriented base film. The sealing layer may be attached to the oriented base film by an adhesive layer, not shown. A sealing layer attached to the oriented base film may or may not be oriented. Advantageously, the sealing layer may not be oriented (i.e. it is non-oriented) such that it retains good sealing properties.

Figure 3A:
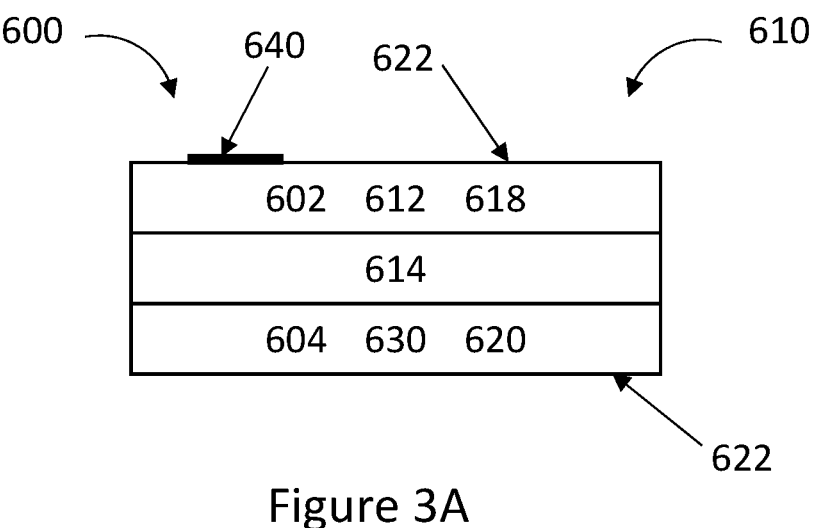
FIG. 3A is a cross sectional view of an embodiment of a recyclable film.
Figure 3B:
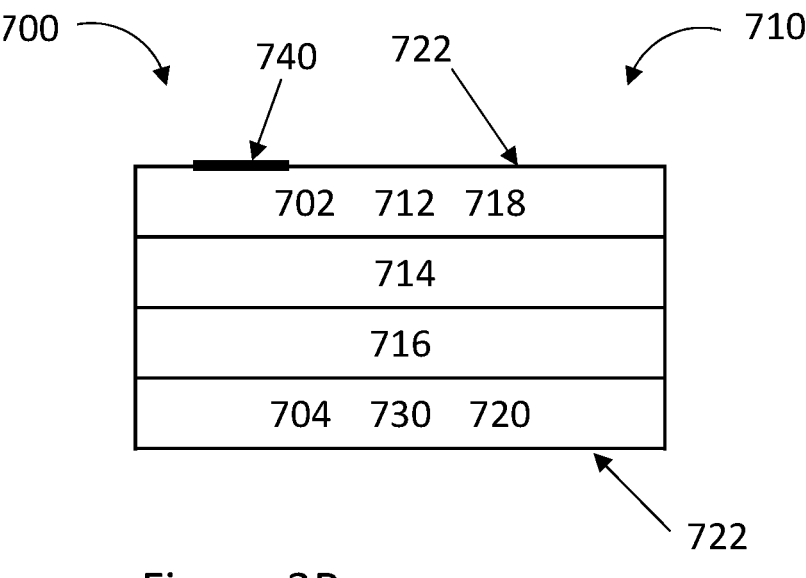
FIG. 3B is a cross sectional view of an embodiment of a recyclable film.

In contrast, FIGS. 3A and 3B show recyclable films 600 and 700 including a sealing layer 630,730 which is part of the oriented base film 610,710. In these embodiments, the sealing layer is oriented and annealed along with the other layers of the oriented base film.

FIG. 3A shows a recyclable film 600 that includes an oriented base film 610 that has a first layer 612, a second layer 614 and a sealing layer 630. The first layer 612 is the first outer layer 618 of the oriented base film 610 and the first outer layer 602 of the recyclable film 600. The sealing layer 630 is the second outer layer 620 of the oriented base film 610 and the second outer layer 604 of the recyclable film 600. Printed indicia 640 is shown on one of the surfaces 622 of the oriented base film, specifically on the surface 622 that includes the first outer layer 618.

FIG. 3B shows a recyclable film 700 that includes an oriented base film 710 that has a first layer 712, a second layer 714, a third layer 716 and a sealing layer 730. The first layer 712 is the first outer layer 718 of the oriented base film 710 and the first outer layer 702 of the recyclable film 700. The sealing layer 730 is the second outer layer 720 of the oriented base film 710 and the second outer layer 704 of the recyclable film 700. Printed indicia 740 is shown on one of the surfaces 722 of the oriented base film, specifically on the surface 722 that includes the first outer layer 718.

The sealing layer may contain any type of material that will allow for bonding during a package production operation. Sealing layer materials need to be chosen based on the process to be used for sealing and the material/component that the recyclable film will be sealed to. In order to further promote the recyclability of the recyclable film, the sealing layer should contain polyolefin materials. The sealing layer may contain more than 50% polyolefin, more than 75% polyolefin, more than 90% polyolefin or more than 95% polyolefin. The sealing layer may contain more than 50% polyethylene, more than 75% polyethylene, more than 90% polyethylene or more than 95% polyethylene. Typical materials used for heat sealing include linear low-density polyethylene, ionomer and ethylene vinyl acetate copolymer, but may be chosen from a wide variety of known materials suitable for heat sealing.

Certain embodiments of the recyclable film include a multilayer film that incorporates the sealing layer as well as other layers such as barrier layers, bulk layers, mechanical strength layers, pigmented layers, etc. In fact, the multilayer film may even include additional polar layers.

The sealing layer may be formulated to provide a peelable seal. As used herein, a "peelable seal" is one that can be separated manually (i.e. by hand, without the use of a tool). Seal strength may be tested using ASTM F88 and a peelable seal may result in a force of between 200 and 2,500 g/in. Often, peelable seals are used for consumer convenience. In the case of a recyclable film used as a packaging component, peelable seals may be highly desired such that the recyclable film may be easily separated from the remainder of the packaging components, facilitating easy recycling. In some cases, the other packaging components that may be present may be recycled in the same stream, may be recycled in a different stream, may be designed for disposal (waste stream) or may be designed for reuse without recycling.

Any layers of the recyclable film may be designed for other functionality. Sealing layers often contain additives such as slip or antiblock. Sealing layers also may have antifog properties. Other layers may be formulated or otherwise configured to provide for easy tear properties, high opacity, colors, anti-scalping properties, or high barrier properties, including but not limited to oxygen or moisture barrier. For example, a layer of a recyclable film may contain titanium dioxide ($TiO_2$) to increase opacity and stiffness for flow wrap applications. One or more layers of the recyclable film could include transparent fillers such as barium sulfate ($BaSO_4$) or sodium sulfate ($Na_2SO_4$).

The recyclable film may also include a barrier layer containing a material for decreasing the transmission rate of gases or other vapors through the film structure. Many high-performance packaging structures include barrier materials such as EVOH, PVOH, G-Polymer, foil, metalized films, PVdC, polyamide (i.e. MXD6) or oxide coated films to achieve the low transmission rates required for extending the shelf life of the product packaged. Many packaged foods and pharmaceuticals (as well as other products) are sensitive to their environment and require a very limited transmission rate through the packaging components. Typically, the barrier materials or barrier layers are tuned to low transmission of oxygen or moisture. A barrier material may be incorporated into the recyclable film in any location.

There may be a barrier layer located within the oriented base film of the recyclable film. A non-limiting example is an oriented base film with a first layer containing EVOH. EVOH has excellent oxygen barrier, which is enhanced upon orientation. EVOH in the oriented base film could provide an improved effect of good barrier, good heat resistance, good thermal stability, printability and good appearance.

In some embodiments, there may be a barrier layer within the multilayer film that includes the sealing layer of the recyclable film. Traditional non-recyclable high-performance packaging materials often use extrudable barrier materials such as EVOH or polyamide in multilayer sealant films. This type of sealant film structure could be incorporated into the recyclable films as well.

It is also contemplated that compatibilizing materials may also be utilized within the recyclable film structure. Compatibilizing materials serve to assist in the incorporation of polar materials into a reprocessing or recycling stream of non-polar polymers, easing processing and quality issues during recycling of the combination. A compatibilizing material generally increases the stability of the dispersed polar material by providing sites that allow the two materials (polar and non-polar) to interact, increasing miscibility. Use of a compatibilizer in a blend of polar and non-polar materials generally creates a more homogeneous blend, avoiding gels and other issues that cause visual or mechanical property quality issues.

In some embodiments of the recyclable film, there may be a barrier layer 560 located between the oriented base film 510 and the sealing layer 530 as shown in FIG. 2C. The oriented base film 510 provides an excellent opportunity to apply coatings, as it has the proper heat resistance, low shrink and dimensional stability to withstand the processes necessary for applying the barrier. For example, the oriented base film 510 could go through a vacuum deposition process that would deposit a thin layer of material, such as but not limited to aluminum or silicon oxide, as a barrier layer 560 to a surface 522 of the oriented base film 510. In some embodiments, the surface 522 of the oriented base film 510 may have printed indicia 540 applied followed by a barrier coating 560. Alternatively, the surface of the oriented base film could have a barrier layer applied first, followed by an optional printed indicia application (not shown). Barrier materials applied as coatings may be any known chemistry, such as crosslinked acrylates or partially neutralized acrylic polymers. Thin layers of depositions or coatings may be useful for the recyclable films as the amount of material used can be easily incorporated into the recycling stream without the need for compatibilizers.

As indicated previously, the recyclable film can incorporate printed indicia. The indicia may be incorporated into the recyclable film in any known process. High performance packaging is typically converted in high speed processes such as rotogravure printing, flexographic printing, or digital printing. For many applications, the printed indicia that is applied to the film is registered with tight repeat tolerances (i.e. each impression of print must be nearly identical in size). The dimensional stability of the oriented base films described herein is useful for these types of printing processes. The oriented base film can have high quality printing applied to either or both surfaces. As shown in FIGS. 2A, 2B and 2C, the printed indicia may be located between the base film and the sealant, protecting the indicia from external abuse such as scuffing.

The oriented base film may have a primer applied or another treatment (i.e. corona treatment) prior to printing to facilitate good ink wetting and adhesion. Printed indicia applied to the first outer layer of the base film that is the first outer layer of the recyclable film (opposite the side the sealing layer is attached to) may also include a protecting layer or another layer to create a visual or tactile effect. The printed indicia may be incorporated as a continuous layer, or applied as a pattern or vignette (an image created by dots). The printed indicia may be continuous with the recyclable film or only cover a small portion of the film. The printed indicia may be visible from either or both sides of the recyclable film.

While the purpose of the proposed recyclable film is to create a material that can be used in high performance packaging applications, the film may also contain materials that have been recycled. Recycled materials such as previously used packaging (post-consumer recyclate, PCR) or film converting trim waste (post-industrial recyclate, PIR) may be incorporated into any portion of the recyclable film. The material may not require compatibilizer or a compatibilizer may be added at the point of incorporation.

The oriented base film, sealant or any other portion of the recyclable film may incorporate any other additives known to be used in packaging films. These additives may include, but are not restricted to, nucleating agents, processing aids, pigments, slip, or antiblock. Additives may also be "active"

in nature, with the intended purpose of interacting with the environment. One example of an active additive is an oxygen absorber.

The recyclable film may have any overall thickness as necessary for the application in which it will be employed. Recyclable films for packaging applications may have a thickness from 1 mil (25.4 micron) to 20 mil (508 micron). The thickness of the recyclable film may be from 1.5 mil (38.1 micron) to 10 mil (254 micron), or from 2 mil (51.7 micron) to 5 mil (127 micron).

When used as a packaging film, the recyclable film may be sealed to itself, or a similar film, or to one or more other packaging components. Other packaging components may include, but are not limited to zippers, fitments, cups or trays. The packaging may also include other components such as patches, liners, sleeves or labels. The packaged may be formed from one, two, three or more different packaging components.

The recyclable film is sealed, or connected, to itself or other packaging components to create a hermetically sealed package. The seals may be made by adhesives, heat sealing, ultrasonic sealing, cold sealing, RF welding or any other known bonding method. Hermetic packaging is critical for a wide variety of products, including foods, beverages, pharmaceuticals, consumer goods and other sensitive products. Hermetic packaging can help prevent damage to the product. For many products, achieving good heat seals to create consistently hermetic packages is highly critical. An advantage of the recyclable films disclosed herein is that they are more heat resistant and thus can be formed into hermetic packaging on a more reliable basis. The combination of the high heat resistance of the oriented base film and the sealing layer that provides quality seals is an important advantage to the films presented herein.

It is also an advantage of some embodiments of the recyclable films disclosed herein that they are provided with sealing layers that achieve peelable seals when heat sealed to other packaging components. Packages can be opened by consumers in many ways, including peeling open manually. Peelable seals are those that can be peeled open by a consumer by hand, without the use of another tool. A consumer can grasp two parts of a package and pull the package open at a heat seal. Peelable seals allow for the product within the package to be easily accessed by the consumer. In some cases, peelable seals can also be manually reclosed and resealed. Additionally, the recyclable films may have peelable heat seals to allow for easy separation of the packaging components. This advantageously allows for proper disposal of the packaging components into other recycling streams or waste streams. The packaging components included in the hermetically sealed package may be recyclable in the same stream as the recyclable film, recyclable in a different stream or not recyclable at all.

The recyclable film may be used in any sort of hermetic package format including, but not limited to, pouches, bags, flow wrap, tray/lid, chub, bulk bag, and blisters. The recyclable film may be used to package any type of product including, but not limited to, dry foods, liquids, meats, cheese, fresh foods, frozen foods, beverages, pharmaceuticals, nutraceuticals, cosmetics, hard-to-hold products, cleaners, chemicals, wipes, medical products, electronic devices, pet foods/treats, bulk products, etc.

Some embodiments of packages that use the recyclable films disclosed herein are in the format of a pouch, bag or sachet. In this format, the recyclable film is used as in at least one of the side-walls of the package, or in some cases, all the side walls. A pouch or bag may be sealed in a fin seal or lap seal configuration. A sachet may have side seals and end seals. Fitments or other closures may be sealed to any part of the recyclable film.

Ideally, the package is configured such that after the contents have been emptied, the package may be opened fully, and the packaging components separated as necessary, for optimal emptying (product removal), rinsing, and recycling. Complete product removal means that the package is free from significant amounts of product that would contaminate the recycling process. Complete product removal may be determined by visual inspection. Complete product removal may be accomplished by rinsing the opened packaging components with water until most or all the product has been removed.

The separation of the packaging components may be facilitated by the previously mentioned peelable seals, or by any other means such as weakened lines or perforations that can be torn open. In some cases, the recyclable film and the other packaging components are designed to be easily torn or cut to facilitate opening. In some embodiments, packaging components remain attached to the recyclable film and are capable of being recycled in the same recycling stream.

The size of the package in which the recyclable film is used is unlimited. The packaging could be very small (a few square inches) or very large, as is the case for bulk container liners. A bulk liner may be made from a recyclable film and in some embodiments, a bulk liner may be made from several plies of recyclable film. The bulk liners may have fitments attached to either surface.

Figure 6:
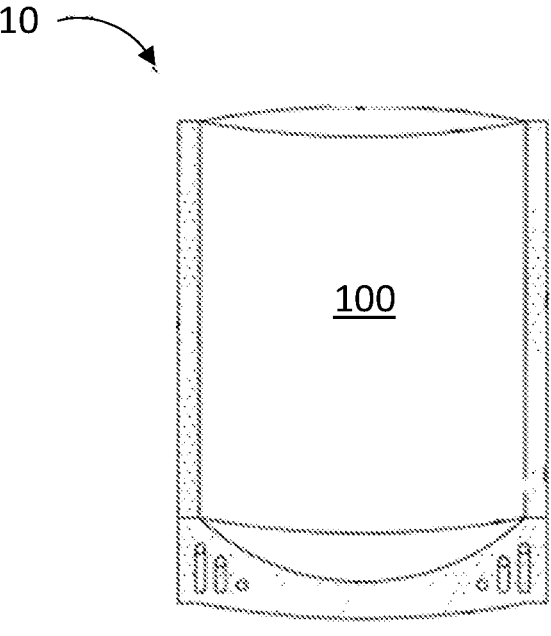
FIG. 6 is a schematic view of an embodiment of a package.
Figure 7:
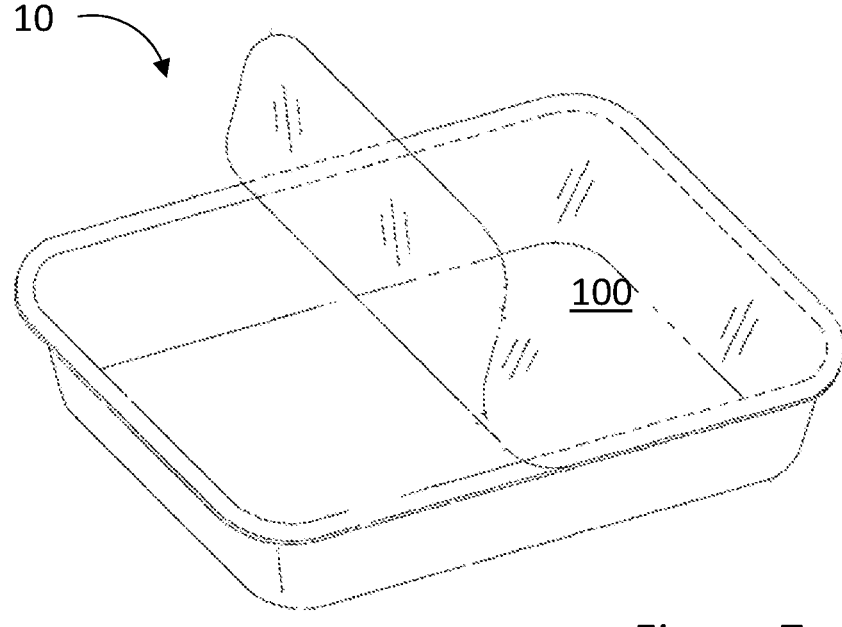
FIG. 7 is a schematic view of an embodiment of a package.

Examples of packages that use recyclable films are shown in FIGS. 6 and 7. FIG. 6 shows a stand-up pouch 10 having sidewalls formed from a recyclable film 100. Here, the recyclable film is folded over, creating a bottom gusset and side panels, and sealed to itself. There is an opening at the top through which the product can be filled. After filling, the top opening is also heat sealed, forming a hermetically sealed package.

In some embodiments, the recyclable film 100 is in the form of a lid that is attached to a tray or cup to form a package 10, as shown in FIG. 7. The tray or cup may be flexible, semi-rigid or rigid and can be made of any material including, but not limited to, polyester, polyethylene, polystyrene, polypropylene, paper, metal, glass or ceramic. FIG. 7 shows the package 10 after the lid 100 has been manually peeled away from the tray. The lid, the tray or both the lid and the tray may be a recyclable film.

The recyclable films described herein may also be used for applications that are not related to packaging.

A non-exhaustive list of prophetic embodiments of the recyclable film is shown below. The structure within the [ ] brackets represent the oriented base film. Layers of the structure are separated by a/slash.

[PA/tie/COC/tie/PA]/ink/adh/PE heat seal
[PA/tie/HDPE/tie/PA]/ink/adh/PE heat seal
[PA/tie/HDPE+MDPE/tie/PA]/ink/adh/PE heat seal
[PA/tie/HDPE]/ink/adh/PE heat seal
[HDPE/tie/PA]/ink/adh/PE heat seal
[PP/tie/PA/tie/PP]/ink/adh/PP heat seal
[PP/tie/PA/tie/PE]/ink/adh/PE heat seal
[COC/tie/PA/tie/PE]/ink/adh/PE heat seal
[PET/tie/PP]/ink/adh/PP heat seal
[COC/tie/PE]/ink/adh/PE heat seal
[EVOH/tie/PP] ink/adh/PP heat seal
[PA/HDPE/PA]/ink/multilayer film containing PE seal and EVOH
OL/ink/[EVOH/HDPE/EVOH]/PE heat seal
OL/ink/[HDPE/tie/PA/tie/HDPE]/PE heat seal Examples & Data Several recyclable films were produced and tested. A summary of the film structures and results of testing are shown in Table 2. The layer % given in Table 2 is by weight. For example, the outer layers of the Example 1 film are each approximately 10% of the total film, by weight. Further details and data are given below Table 2. Also included in Table 2 is a qualitative result of evaluating these films during high speed wide web flexographic printing, using the ability to hold tight print tolerance (<1% variation) as an indication of dimensional stability.

(MDPE). In addition to the first, second and third layer, Example 1 also includes two additional layers, each containing a polymeric adhesive material (i.e. PE tie), a polyethylene polymer grafted with maleic anhydride functional groups.

Example 2 was produced as an embodiment of an oriented base film. Example 2 is the same as Example 1 apart from the thickness of the film being approximately 0.75 mil and the basis weight being approximately 18.5 g/m$^2$.

Example 3 was produced as an embodiment of an oriented base film. Example 3 is like Example 1, having a slightly thicker core layer and using a different linear medium

TABLE 2

Summary of Example Films

| Designation | Structure Details | General Comments |
|---|---|---|
| Example 1 | Blown film, in-line MDO 3:1<br>1 mil thickness<br>10% PA/7.5% PE tie/65% HDPE-MDPE2 (50:50)/7.5% PE tie/10% PA | Good dimensional stability during printing |
| Example 2 | Blown film, in-line MDO 3:1<br>0.75 mil thickness<br>10% PA/7.5% PE tie/65% HDPE-MDPE2 (50:50)/7.5% PE tie/10% PA | Good dimensional stability during printing |
| Example 3 | Blown film, in-line MDO 3:1<br>1 mil thickness<br>10% PA/7.5% PE tie/65% HDPE-MDPE1 (50:50)/7.5% PE tie/10% PA | Good dimensional stability during printing |
| Example 4 | Blown film, off-line MDO 3:1<br>1 mil thickness<br>10% PA/7% PE tie/22% MDPE1/22% COC/22% MDPE1/7% PE tie/10% PA | Good dimensional stability during printing |
| Comparative Example 1 | Blown film, in-line MDO 3:1<br>0.75 mil thickness<br>10% PA/10% PE tie/60% MDPE2/10% PE tie/10% PA | Insufficient dimensional stability during printing |
| Comparative Example 2 | Blown film, off-line MDO 5.5:1<br>HDPE/mLLDPE/MDPE/mLLDPE/HDPE | Good dimensional stability during printing, insufficient heat resistance |
| Comparative Example 3 | 48 ga BON (biaxially oriented polyamide) | Good dimensional stability during printing, good heat resistance, not recyclable |
| Comparative Example 4 | 48 ga OPET (biaxially oriented polyester) | Good dimensional stability during printing, good heat resistance, not recyclable |
| Comparative Example 5 | 60 ga BOPP (biaxially oriented polypropylene) | Insufficient dimensional stability during printing |
| Comparative Example 6 | 100 ga BOPE (biaxially oriented polyethylene) | Good dimensional stability during printing, insufficient heat resistance |

PA is a polyamide 6/66 with antiblock and lubricant additives, UBE 5033 FDX27, available from UBE
HDPE is a high-density polyethylene polymer, ExxonMobil 7845.30, available from ExxonMobil. Density = 0.958 g/cm$^3$
MDPE1 is a linear medium density copolymer, Enable 3505MC, available from ExxonMobil
MDPE2 is a linear medium density copolymer, Enable 3505HH, available from ExxonMobil
COC is a cyclic olefin copolymer, Topas ® 8007, available from TOPAS Advanced Polymers
PE tie is a standard coextrusion adhesion material based on a polyethylene polymer grafted with maleic anhydride functional groups Example 1 was produced as an embodiment of an oriented base film. The film was produced using a blown film coextrusion process with in-line machine direction orientation (MDO) and annealing. The film was stretched approximately 3:1 and the final film had a thickness of approximately 1 mil and a basis weight of approximately 24.6 g/m$^2$. Each of the first and second outer layer (i.e. the first layer and the third layer) of the Example 1 film consists of a polyamide 6/66 polymer. The center layer (i.e. the second layer) of Example 1 contains a 50:50 blend of a high-density polyethylene polymer (HDPE) having a density of 0.958 g/cm$^3$, and a linear medium density polyethylene polymer density polyethylene polymer. The film was stretched approximately 3:1 and the final film had a thickness of approximately 1 mil and a basis weight of approximately 24.6 g/m$^2$.

Example 4 was produced as an embodiment of an oriented base film. Example 4 was produced using a blown film coextrusion process, and subsequently machine direction oriented and annealed in an off-line process. The film was stretched approximately 3:1 and the final film had a thickness of approximately 1 mil and a bases weight of approximately 24.6 g/m$^2$. Each of the first and second outer layer (i.e. the first layer and the third layer) of the Example 4 film consists of a polyamide 6/66 polymer. The center layer (i.e. the second layer) of Example 4 contains a cyclic olefin copolymer (COC) of ethylene/norbornene. In addition to the first, second and third layer, Example 4 also includes four additional layers, two layers containing a polymeric adhesive material, a polyethylene polymer grafted with maleic anhydride functional groups, and two layers containing a linear medium density polyethylene polymer (MDPE).

Comparative Example 1 was produced in a similar manner as the example films but does not include a second layer containing a stabilizing polyolefin. Like the other films, Comparative Example 1 was produced using a blown film coextrusion process including in-line MDO and annealing. Comparative Example 1 was stretch approximately 3:1 and the final film had a thickness of approximately 0.75 mil and a basis weight of approximately 18.5 g/m².

Comparative Example 2 was produced in a similar manner as the example films but does not include the first and third layer having a polar polymer. Comparative Example 2 film has outer layers that contain high-density polyethylene and center layers that contain lower density polyethylene polymers. This film is 100% polyolefin and contains no polar polymers.

Comparative Examples 3 and 4 are oriented films, biaxially oriented polyamide (BON) and biaxially oriented polyester (OPET), respectively, which are typically used as printing substrates for packaging laminates. These films are not recyclable.

Comparative Examples 5 and 6 are oriented films, biaxially oriented polypropylene (BOPP) and biaxially oriented polyethylene (BOPE), respectively.

Each of the example films and comparative example films were tested for free shrink according to ASTM D2732 using bath temperature of 90° C. All of the films have a free shrink of less than 5% in both the machine direction and the transverse direction.

The oriented base films were tested to determine the converting related strain value using the test procedure described herein. The data collected across the temperature range of 55° C. to 100° C. is shown in FIGS. 8 and 9. Individual data points for the specific temperatures of 65, 70, 75, 80 and 85° C. are shown in Table 3.

It is evident from comparing the qualitative dimensional stability information of Table 2, with the converting related strain values shown in FIGS. 8 and 9, there is good correlation and that converting related strain can be used to predict performance. Converting related strain values that are too low, such as below 0% (i.e. a film that shrinks), indicates a film that will not reliably hold good print tolerance. Converting related strain values that are too high, such as above 0.5% at 65° C. or above 0.75% at 75° C. or above 1% at 85° C., will also not reliably hold good print tolerance.

The converting related strain values of Comparative Examples 3 (data points shown as plus marks '+' in the plot of FIG. 9) and 4 (data points shown as open circles 'o' in FIG. 9), are of interest as they are not recyclable and are typically used in the flexible packaging industry as print webs. These materials are commonly used specifically because they have extremely good dimensional stability through converting processes such as printing and laminating. Again, this correlates well with the data shown, as these film exhibit strain values close to 0.0% at the temperatures of interest (about 55° C. to about 85° C.). As shown in FIG. 9, the films of Example 1, Example 2, Example 3 and Example 4 have converting related strain values close to those of these "ideal" films over at least a portion of the temperature range of interest. These example films exhibit an ability to hold good print repeat tolerance during converting.

In comparison, the converting related strain values of Comparative Example 1 (data shown as X marks 'x' in the plot of FIG. 8) show that across the tested temperatures, the strain value (%) is higher than the other films. While this film is similarly recyclable and heat resistant, as compared to the oriented base films described herein, Comparative Example 1 does not exhibit sufficient dimensional stability. The film is difficult to convert into packaging given the demands for tight print tolerance for most packaging equipment.

The films of Comparative Example 5 (data shown as open triangle 'Δ' in the plot of FIG. 8) and Comparative Example 6 (data shown as large filled circles ' ' in the plot of FIG. 8) show high converting related strain values and are correspondingly difficult to print with tight print tolerance.

The film of Comparative Example 2 (data shown as small filled circles ' ' in the plot of FIG. 8) show converting related strain values that are close to the "ideal" films (Comparative Examples 3 and 4). This film can be printed with tight print repeat tolerances. However, this film lacks suitable heat resistance and has other draw backs as it relates to packaging.

The converting related strain curves for Example 1 (data shown as filled triangles '▲' in the plot of FIG. 8), Example 2 (data shown as open circles 'o' in the plot of FIG. 8) and Example 3 (data shown as plus marks '+' in the plot of FIG. 8) each remain at a level suitable for holding tight print tolerance during converting.

Also of note, Example 4 film demonstrates an acceptable converting related strain value at temperatures up to about 77° C. (data shown as open squares '□' in the plot of FIG. 8). At converting temperatures that are above 77° C., the film may have difficulty holding good print tolerance. The inventors note that the print tolerance at higher temperatures may improve by increasing the annealing process temperatures.

TABLE 3

| Converting Related Strain Value (%) Data | | | | |
|---|---|---|---|---|
| Film Sample | Strain, % (65° C.) | Strain, % (70° C.) | Strain, % (75° C.) | Strain, % (80° C.) | Strain, % (85° C.) |
| Example 1 | 0.38 | 0.46 | 0.57 | 0.68 | 0.88 |
| Example 2 | 0.43 | 0.51 | 0.61 | 0.73 | 0.93 |
| Example 3 | 0.07 | 0.10 | 0.13 | 0.18 | 0.28 |
| Example 4 | 0.04 | 0.04 | 0.02 | −0.06 | −0.36 |
| Comparative Example 1 | 0.66 | 0.80 | 0.94 | 1.17 | 1.4 |
| Comparative Example 2 | 0.21 | 0.23 | 0.24 | 0.23 | 0.17 |
| Comparative Example 3 | −0.04 | −0.03 | −0.01 | 0.02 | 0.07 |
| Comparative Example 4 | 0.00 | 0.00 | 0.00 | 0.01 | 0.03 |
| Comparative Example 5 | 0.52 | 0.68 | 0.85 | 1.04 | 1.38 |
| Comparative Example 6 | 0.83 | 1.01 | 0.23 | 1.47 | 1.88 |

Embodiments of the Invention

First Embodiment: A recyclable film comprising:
an oriented base film comprising a first layer comprising a first polar polymer and a second layer comprising a stabilizing polyolefin,

US 12,668,044 B2

23 wherein the stabilizing polyolefin is selected from the group of an ethylene/norbornene copolymer having a norbornene content greater than 20 mol %, a polyethylene polymer having a density greater than 0.94 g/cm³, and a polypropylene homopolymer, and wherein the oriented base film has a converting related strain value from 0% to 0.75%, at a temperature of 75° C. under a load of 80 N/m.

Second Embodiment: The recyclable film of the First Embodiment, wherein the first layer comprises a composition including from 50% to 100% of the first polar polymer, by weight, and the first polar polymer is a polyamide, a polyester or an ethylene vinyl alcohol copolymer (EVOH).

Third Embodiment: The recyclable film of the Second Embodiment, wherein the first polar polymer is polyamide 6/66.

Fourth Embodiment: The recyclable film of any previous embodiment, wherein the first layer of the oriented base film is a first outer layer of the oriented base film.

Fifth Embodiment: The recyclable film of the Fourth Embodiment, wherein the first layer of the oriented base film is a first outer layer of the recyclable film.

Sixth Embodiment: The recyclable film of any previous embodiment, further comprising a sealing layer, wherein the first layer of the oriented base film is a first outer layer of the recyclable film and the sealing layer is a second outer layer of the recyclable film.

Seventh Embodiment: The recyclable film of the Sixth Embodiment, wherein the sealing layer is not oriented.

Eighth Embodiment: The recyclable film of any previous embodiment, wherein the oriented base film has a free shrink value of less than 5% in both the machine direction and the transverse direction when tested according to ASTM D2732 using bath temperature of 90° C.

Ninth Embodiment: The recyclable film of any previous embodiment, wherein the oriented base film further comprises a third layer comprising a second polar polymer, wherein the second layer is between the first layer and the third layer.

Tenth Embodiment: The recyclable film of the Ninth Embodiment, wherein the first layer is a first outer layer of the oriented base film and the third layer is a second outer layer of the oriented base film.

Eleventh Embodiment: The recyclable film of any previous embodiment, further comprising a total composition, wherein the total composition comprises not more than 20% polar polymer.

Twelfth Embodiment: The recyclable film of any previous embodiment, further comprising printed indicia located on a major surface of the oriented base film.

Thirteenth Embodiment: The recyclable film of the Sixth Embodiment, further comprising a barrier layer comprising a barrier material, the barrier layer located between the first layer and the sealing layer.

Fourteenth Embodiment: The recyclable film of any previous embodiment, wherein the recyclable film consists of the oriented base film, the oriented base film comprises a sealing layer and the sealing layer is an outer layer of the oriented base film.

Fifteenth Embodiment: A recyclable film comprising:
a) an oriented base film comprising:
i) a first layer comprising a first polar polymer,
ii) a second layer comprising a stabilizing polyolefin comprising a refractive index between 1.526 and 1.542, and
iii) a third layer comprising a second polar polymer,
b) a sealing layer, and

24 c) printed indicia located on one of the major surfaces of the oriented base film, and wherein the oriented base film has a free shrink value of less than 5% in both the machine direction and the transverse direction when tested according to ASTM D2732 using bath temperature of 90° C.

Sixteenth Embodiment: The recyclable film of the Fifteenth Embodiment, wherein the oriented base film has a converting related strain value comprised between 0% and 0.75% when measured at a temperature of 75° C. under a load of 80 N/m.

Seventeenth Embodiment: The recyclable film of the Fifteenth Embodiment or the Sixteenth Embodiment, wherein:
the second layer is between the first layer and the third layer,
the first layer comprises a composition including from 50% to 100% of the first polar polymer, by weight,
the first polar polymer is polyamide 6/66,
the third layer comprises a composition including from 50% to 100% of the second polar polymer, by weight, and
the second polar polymer is polyamide 6/66.

Eighteenth Embodiment A recyclable film comprising:
a) an oriented base film comprising:
i) a first layer comprising a first polar polymer,
ii) a second layer comprising a stabilizing polyolefin comprising a refractive index between 1.526 and 1.542, and
iii) a third layer comprising a second polar polymer, and
b) a sealing layer, and
wherein the first layer is a first outer layer of the oriented base film, the first layer is a first outer layer of the recyclable film, the third layer is a second outer layer of the oriented base film and the sealing layer is a second outer layer of the recyclable film.

Nineteenth Embodiment: The recyclable film of the Eighteenth Embodiment further comprising printed indicia deposited on a major surface of the oriented base film.

Twentieth Embodiment: The recyclable film of the Eighteenth Embodiment or the Nineteenth Embodiment wherein the sealing layer is not oriented.

What is claimed is:

1. A recyclable film comprising:
an oriented base film comprising a first layer comprising a first polar polymer and a second layer comprising a stabilizing polyolefin,
wherein the stabilizing polyolefin is selected from the group of an ethylene/norbornene copolymer having a norbornene content greater than 20 mol %, a polyethylene polymer having a density greater than 0.94 g/cm³, and a polypropylene homopolymer, and
wherein the oriented base film has a converting related strain value from 0% to 0.75%, at a temperature of 75° C. under a load of 80 N/m.

2. The recyclable film of claim 1, wherein the first layer comprises a composition including from 50% to 100% of the first polar polymer, by weight, and the first polar polymer is a polyamide, a polyester or an ethylene vinyl alcohol copolymer (EVOH).

3. The recyclable film of claim 2, wherein the first polar polymer is polyamide 6/66.

4. The recyclable film of claim 1, wherein the first layer of the oriented base film is a first outer layer of the oriented base film.

5. The recyclable film of claim 4, wherein the first layer of the oriented base film is a first outer layer of the recyclable film.

6. The recyclable film of claim 1, further comprising a sealing layer, wherein the first layer of the oriented base film is a first outer layer of the recyclable film and the sealing layer is a second outer layer of the recyclable film.

7. The recyclable film of claim 6, wherein the sealing layer is not oriented.

8. The recyclable film of claim 1, wherein the oriented base film has a free shrink value of less than 5% in both the machine direction and the transverse direction when tested according to ASTM D2732 using bath temperature of 90° C.

9. The recyclable film of claim 1, wherein the oriented base film further comprises a third layer comprising a second polar polymer, wherein the second layer is between the first layer and the third layer.

10. The recyclable film of claim 9, wherein the first layer is a first outer layer of the oriented base film and the third layer is a second outer layer of the oriented base film.

11. The recyclable film of claim 1, comprising a total composition, wherein the total composition comprises not more than 20% polar polymer, by weight.

12. The recyclable film of claim 1, further comprising printed indicia located on a major surface of the oriented base film.

13. The recyclable film of claim 6, further comprising a barrier layer comprising a barrier material, the barrier layer located between the first layer and the sealing layer.

14. The recyclable film of claim 1, wherein the recyclable film consists of the oriented base film, the oriented base film comprises a sealing layer and the sealing layer is an outer layer of the oriented base film.

\*    \*    \*    \*    \*